(12) United States Patent
Enders

(10) Patent No.: US 9,827,910 B2
(45) Date of Patent: Nov. 28, 2017

(54) MOTOR VEHICLE WITH AN EXTERNAL REAR-VIEW MIRROR

(71) Applicant: Bayerische Motoren Werke Aktiengesellschaft, Munich (DE)

(72) Inventor: Martin Enders, Deisenhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 335 days.

(21) Appl. No.: 14/267,164

(22) Filed: May 1, 2014

(65) Prior Publication Data
US 2014/0240860 A1 Aug. 28, 2014

Related U.S. Application Data

(63) Continuation of application No. PCT/EP2012/071158, filed on Oct. 25, 2012.

(30) Foreign Application Priority Data

Nov. 2, 2011 (DE) .......................... 10 2011 085 579

(51) Int. Cl.
*H04N 7/18* (2006.01)
*B60R 1/07* (2006.01)
(Continued)

(52) U.S. Cl.
CPC .................. *B60R 1/07* (2013.01); *B60R 1/00* (2013.01); *B60R 1/074* (2013.01); *B60R 2300/70* (2013.01)

(58) Field of Classification Search
None
See application file for complete search history.

(56) References Cited

U.S. PATENT DOCUMENTS

| 8,463,488 B1* | 6/2013 | Hart ........................ G07C 5/008 340/576 |
| 2003/0026012 A1* | 2/2003 | Pavao ................... B60Q 1/2665 359/872 |

(Continued)

FOREIGN PATENT DOCUMENTS

| DE | 10 2009 040 055 A1 | 4/2010 |
| JP | 2001-180374 A | 7/2001 |

(Continued)

OTHER PUBLICATIONS

International Search Report (PCT/ISA/210) with English translation dated Dec. 19, 2012 (Eight (8) pages).

(Continued)

*Primary Examiner* — James M Anderson, II
(74) *Attorney, Agent, or Firm* — Crowell & Moring LLP

(57) ABSTRACT

A motor vehicle having an external rearview mirror includes a mirror drive assigned to the external rearview mirror, by which the external rearview mirror can be moved into a first mirror position or into a second mirror position, at least one display unit that can be viewed by the driver of the motor vehicle, and a camera directed at the rearward vehicle surroundings, which camera supplies an image signal on which an image of the surroundings is based that can be displayed by the display unit. A vehicle speed sensor and a control unit are provided by which the mirror drive can be controlled as a function of the driving speed such that the external rearview mirror is moved from the first mirror position into the second mirror position.

20 Claims, 1 Drawing Sheet

(51) Int. Cl.
*B60R 1/074* (2006.01)
*B60R 1/00* (2006.01)

(56) References Cited

U.S. PATENT DOCUMENTS

| | | | | |
|---|---|---|---|---|
| 2003/0202683 | A1* | 10/2003 | Ma | G08G 1/096716 |
| | | | | 382/104 |
| 2008/0055411 | A1 | 3/2008 | Lee | |
| 2010/0046104 | A1* | 2/2010 | Rimac | B60R 1/025 |
| | | | | 359/843 |

FOREIGN PATENT DOCUMENTS

| | | | |
|---|---|---|---|
| JP | 2003-104123 A | | 4/2003 |
| JP | 2009-280196 A | | 12/2009 |
| JP | 2009280196 A | * | 12/2009 |

OTHER PUBLICATIONS

German language Search Report with English translation dated Jul. 18, 2012 (Ten (10) pages).

\* cited by examiner

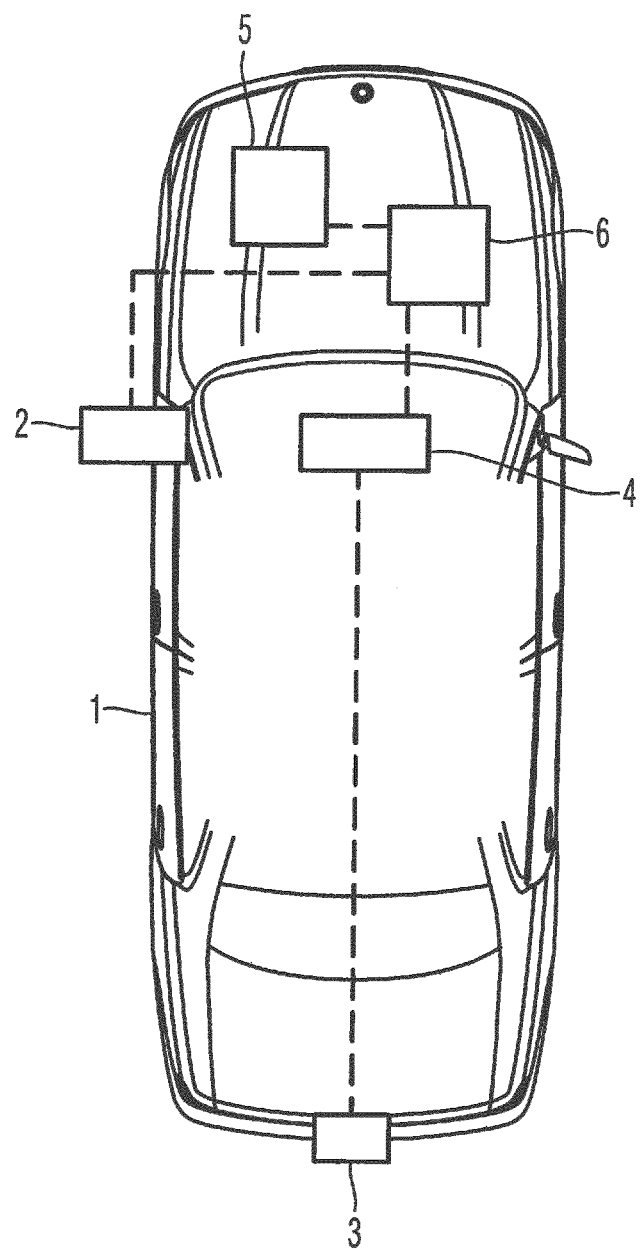

MOTOR VEHICLE WITH AN EXTERNAL REAR-VIEW MIRROR

CROSS REFERENCE TO RELATED APPLICATIONS

This application is a continuation of PCT International Application No. PCT/EP2012/071158, filed Oct. 25, 2012, which claims priority under 35 U.S.C. §119 from German Patent Application No. 10 2011 085 579.3, filed Nov. 2, 2011, the entire disclosures of which are herein expressly incorporated by reference.

BACKGROUND AND SUMMARY OF THE INVENTION

This invention relates to a motor vehicle having an external rearview mirror.

In order to provide the driver of a motor vehicle with the possibility of viewing and monitoring the rearward road space, exterior rearview mirrors, or abbreviated, external mirrors, are provided among others in the case of motor vehicles. From the state of the art, it is also known, among other things, to design such an external mirror to be adjustable and/or heatable. As an alternative or in addition to providing an external mirror, it is known to display the image of one or more cameras directed at the rearward road space by means of a display unit, which can be viewed by the driver.

It is an object of the invention to provide a motor vehicle which offers an improved overall solution for providing a view of the rearward road space.

This and others objects are achieved by a motor vehicle according to the invention comprising an external rearview mirror and a mirror drive assigned to the external rearview mirror, by which the external rearview mirror can be moved into a first mirror position or into a second mirror position. The motor vehicle further comprises at least one display unit, which can be viewed by a driver of the motor vehicle, and a camera directed at the rearward vehicle surroundings, which camera supplies an image signal on which an image of the surroundings is based that can be displayed by the display unit. In addition, the motor vehicle has devices for determining the driving speed of the motor vehicle and includes a control unit, by which the mirror drive can be controlled as a function of the driving speed such that the external rearview mirror is moved from the first mirror position into the second mirror position.

The mirror movement can consist particularly of a swiveling or hinge-type movement. For the purpose of simplifying the language, a folding-in or folding-out of the external mirror and/or a change-over of the mirror position will therefore frequently be mentioned in the following.

While known solutions usually have had the goal of improving the system with a concrete focus (for example, on the optimal view of the rearward road space), in the case of the present invention, the creation of an overall optimum is in the foreground.

At a high forward-driving speed, a significant contribution is made to lowering the fuel consumption and emissions in that the aerodynamics of the vehicle are improved by the folding-in of the external mirror. This takes place while accepting a possibly degraded view of the rearward road space. At a lower forward-driving speed, as well as when the vehicle is stationary and when it is backing up, an improved view of the rearward road space is provided by providing a "real" external mirror. This again takes place while accepting degraded aerodynamics.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a schematic block diagram view of the components of an embodiment of a motor vehicle according to the invention.

DETAILED DESCRIPTION OF THE DRAWING

Referring to the embodiment of FIG. 1, for providing a driver's view of the rearward road space, a motor vehicle 1 includes a combination of a "physical" or "real" external mirror 2 and an "electronic" rearview mirror. The electronic rearview mirror is implemented as a vehicle subsystem which comprises a camera 3 directed to the rearward road space and a display unit 4 that can be viewed by the driver.

The camera 3 may, for example, be a backup camera of the vehicle. In particular, the camera 3 may be arranged in the area of the external mirror 2 and/or may be integrated in the latter.

The external mirror 2 includes an integrated, for example, electric-motor-driven folding or swiveling mechanism, by which the external mirror 2 can be folded or swiveled particularly into a first mirror position or into a second mirror position. The folding or swiveling mechanism or its drive is controlled by a control unit 6 of the vehicle. The folding and swiveling mechanism may be implemented in many different fashions which are known per se.

In the first mirror position, the external mirror 2 is folded out and its "real" mirror surface can be used by the driver for observing or monitoring the rearward space of the vehicle. The external mirror 2 will be in this first mirror position particularly at a low forward-driving speed, when the vehicle is stationary and when the vehicle is backing up. The reason is that, in these driving states, the aerodynamics of the vehicle play only a relatively minor role with respect to energy consumption and emissions of the vehicle. As a result of the usability of the "real" external mirror in the above-mentioned driving states, it is ensured that, during parking and maneuvering as well as in city traffic, the view toward the rearward road space will be satisfactory for the driver and will also meet possible legal requirements.

In the second mirror position, the external mirror 2 is folded onto the vehicle. It may be accommodated, for example, in a recess in a vehicle body shell. The aerodynamic drag of the vehicle is reduced by the folding-in, and the emissions of the vehicles are reduced. The external mirror 2 is in this second mirror position particularly at a high forward-driving speed.

When the external mirror 2 is in the second mirror position, the driver can view the rearward road space by way of the "electronic" rearview mirror; i.e. he can view the picture of the camera 3 on the display unit 4.

Depending on the embodiment of the invention, the image of the rearward road space can be taken by one or more cameras. In a manner that is known per se, the cameras may be swivelable and/or zoomable.

The external mirror 2 and the camera 3 may also be integrated in a joint folding or swiveling mechanism, by which it is ensured that the camera 3 will be directed toward the rearward road space at least when the external mirror 2 is in the second mirror position. In contrast, when the external mirror 2 is in the first mirror position, the camera 3 does not necessarily have to be directed toward the rearward road space, and/or it can be completely or partially covered by the external mirror 2.

The images taken can also be displayed in many different fashions in a manner known per se, particularly individually or merged, completely or as details, unprocessed or augmented. The display unit 4 may consist of a single display or include several individual displays. It may particularly also include a head-up display. The location and the type of the display can be implemented such that they can be configured by the driver. When at least one stereo-compatible display is used, the driver can be provided with an improved basis for estimating distances.

The "electronic" rearview mirror 3, 4 or its individual components 3 and 4, as required, can be activated only when the external mirror 2 is moved from the first into the second mirror position. Advantageously, an activation of the "electronic" rearview mirror can already take place during the folding or swiveling phase of the "real" external mirror 2. According to a preferred embodiment of the present invention, the external mirror 2 is moved into the second mirror position only when the activation operation of the "electronic" rearview mirror 3, 4 has been concluded and a camera picture is reliably available on the display unit 4. A time buffer may also be provided in order to permit the driver to understand and comprehend that now—as an alternative to the "real" external mirror—a camera picture is available on the display unit 4.

The "electronic" rearview mirror 3, 4 or its individual components 3 and 4 may basically also be or remain activated when the external mirror 2 is in the first mirror position. When the "electronic" rearview mirror then offers approximately the same view toward the rearward road space which the "real" external mirror also offers, it is will be up to the driver to decide on which image he wants to rely. However, an even greater value can be created for the driver in that the "electronic" rearview mirror represents a detail of the surroundings which cannot be viewed by means of the "real" external mirror.

The driving speed of the motor vehicle 1 is detected by way of a speed detection unit 5 and is transmitted to the control unit 6. As a function of the value of the driving speed, the latter causes the external mirror 2 to be moved into the first or second mirror position.

It is particularly advantageous to set the threshold value in the range of between 110 km/h and 130 km/h. A folding-in of the external mirror above such a threshold value is ecologically significant but results in an excessively large number of mirror movements.

In the embodiment of the invention described here, the external mirror 2 is moved from the first into the second mirror position, i.e. it is folded in, at a forward driving speed above a threshold value of 110 km/h. When there is a falling-below this threshold value, i.e. at lower forward driving speeds, when the vehicle is stationary or when the vehicle is backing up, the external mirror 2 is moved from the second into the first mirror position.

In order to avoid an excessively large number of mirror movements, the control algorithm may also either provide that a change-over from the first mirror position (folded-out) into a second mirror position (folded-in) takes place when a first threshold value is exceeded which is greater than a second threshold value whose falling-below causes a change-over from the second mirror position into the first mirror position. As an alternative or in addition, the control algorithm can take into account whether a threshold value is exceeded in a lasting manner or only for a short time. The algorithm may then be designed such that, for example, the short-term exceeding of the threshold value, possibly within the scope of a passing operation, does not yet result in a mirror movement, but the lasting exceeding of the threshold value within the scope of driving up an expressway access ramp will do so.

In addition to the driving speed, the road type of the traveled road can also be determined (for example, by use of navigation data) and can be taken into account in the algorithm of the control unit 6. For example, on expressways—in contrast to roads of a different road type—, a brief exceeding of the threshold value may already result in a change-over from the first mirror position (folded-out) into the second mirror position (folded-in), because, with respect to expressways, it should be assumed that the high-speed driving will continue.

So that the driver will not unexpectedly or at the wrong time be deprived of the view toward the rearward road space when the threshold value is exceeded, before the final folding-in of the external mirror 2, the driver's consent may be requested and/or the driver may be provided with the possibility of preventing and/or delaying the folding-in of the external mirror 2. This can be implemented, for example, with relatively little distraction, by means of a voice dialog (System: "Folding-in of External mirror OK?–Driver: "Yes."/No").

The imminent exceeding of the threshold value can also be predicted from the time history of the driving speed, in order to obtain the driver's consent in good time.

If the driver's viewing direction can be detected by a suitable viewing-direction detecting unit provided at the vehicle, the driver's viewing direction can also be included in the control algorithm. In particular, the algorithm can provide that the folding-in will, for example, take place only if the driver has not looked at the external mirror 2 within an analyzed time period, and/or only if he has looked at least once within an analyzed time period at the picture of the "electronic" rearview mirror on the display unit 4.

The threshold value of the forward-driving speed, at which the folding-in is caused or triggered or takes place, can be implemented in a configurable manner. In the case of several potential drivers of the vehicle, this can also take place in a personalized fashion. The folding-in can also be completely deactivated by a high threshold value or another configuration. Drivers to whom the availability of a "real" mirror image is very important are therefore not, or not too frequently, deprived of it. For other drivers, a lower value can be selected with corresponding consumption and emission advantages. Each driver himself can preferably carry out the configuration in a menu-based manner. As a result of a driver profile, coupled, for example, to the used vehicle key, the settings of the respective driver can be maintained for later drives. A possibility of the configuration of the threshold value can preferably be restricted to an ecologically significant value range (for example, values above 110 km/h). The setting of the value range can also take into account that, for reasons of wear and distraction, no excessively high number of mirror movements should occur. Corresponding to such considerations, the bottom limit could particularly not be set to be too low, for example, not below the permissible maximum speed within town limits or not below the permissible maximum speed on country roads.

A folding-in of the external mirror is preferably omitted in the event of the detection of a defect of the "electronic" rearview mirror system or of one of its components.

In addition, a folding-in of the external mirror is preferably omitted in the event of the recognition of conditions of the environment or of the surroundings (darkness, fog, rain, type of road, winding of the traveled road, etc.), which suggest an unsatisfactory system performance. The conditions of the environment or of the surroundings should then be detected by appropriate sensors of the vehicle which, in modern motor vehicles, are frequently provided anyhow for assisting other vehicle functions, and should be taken into account algorithmically by the control unit 6.

Likewise, a selection or predefinition of the mirror position may advantageously take place by way of a driver assistance system observing the rearward road traffic (such as a lane change warning device). In the case of such an implementation, for example, the range of the rearward road space that is relevant to the secure guidance of the vehicle could be displayed on the display unit in a zoomed or enlarged fashion. This would assist particularly vehicle drivers who have limited visual acuity for guiding the vehicle in an improved manner.

Furthermore, an image processing unit connected to the camera—particularly at night—can analyze the luminance and/or the brightness distribution of the image of the rearward road space and control the display (for example, by changing the contrast) such that, with as little effort as possible, the driver will be able to recognize the image or its relevant components. Particularly a glare and/or the necessity of a dimming can thereby be avoided. Finally, the disadvantage of a dimming (for example, in the case of electrochromic external mirrors) is the fact that the entire picture is dimmed, at the expense of the perceptibility of dark objects. In particular, as a result of a targeted contrast exaggeration, if necessary, a reduced contrast sensitivity of the driver can be counteracted.

If required, the display unit may also be integrated in the external mirror itself or in its mirror surface/mirror glass.

Furthermore, the folding-in may be coupled to certain times of day and other conditions (bright, dark, sunlight glare from behind, etc.).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle, comprising:
  an external rearview mirror;
  a mirror drive coupled to the external rearview mirror for moving the external rearview mirror into a first mirror position or a second mirror position;
  a display unit arranged in the vehicle so as to be viewable by a driver of the vehicle;
  a camera of the vehicle, the camera being directed at rearward vehicle surroundings and supplying an image signal on which an image of the surroundings is based that is displayable by the display unit;
  a vehicle speed sensor for determining a driving speed of the motor vehicle; and
  a control unit operatively configured to:
    determine that a value of the driving speed exceeds a first predefined threshold value that is greater than a second predefined threshold value,
    determine a time period that the value of the driving speed exceeds the first predefined threshold value, and control the mirror drive such that the external rearview mirror is moved from the first mirror position into the second mirror position when the time period exceeds a predefined length of time,
    determine a type of road that the motor vehicle is traveling on, wherein the predefined length of time associated with the time period that the value of the driving speed exceeds the first predefined threshold value is adjusted based at least in part on the determined type of road,
    determine that the value of the driving speed falls below the second predefined threshold value, and
    control the mirror drive such that the external rearview mirror is moved from the second mirror position into the first mirror position when the value of the driving speed falls below the second predefined threshold value.

2. The motor vehicle according to claim 1, wherein the control unit controls the mirror drive to move the external rearview mirror from the second mirror position into the first mirror position when the value of the driving speed falls below the predefined threshold value.

3. The motor vehicle according to claim 2, wherein the external rearview mirror is movable via a swiveling or folding movement into the first or second mirror positions.

4. The motor vehicle according to claim 1, wherein the external rearview mirror is movable via a swiveling or folding movement into the first or second mirror positions.

5. The motor vehicle according to claim 2, wherein the predefined threshold value is selected based upon an ecologically significant value range.

6. The motor vehicle according to claim 2, further comprising:
  an operator interaction unit by which movement of the external rearview mirror from the first mirror position into the second mirror position is preventable and/or delayable, even in an event that a value of the driving speed exceeds the predefined threshold value.

7. The motor vehicle according to claim 6, further comprising:
  a driver viewing direction unit configured such that movement of the external rearview mirror from the first mirror position into the second mirror position is preventable and/or delayable, even in an event that a value of the driving speed exceeds the predefined threshold value.

8. The motor vehicle according to claim 2, further comprising:
  a driver viewing direction unit configured such that movement of the external rearview mirror from the first mirror position into the second mirror position is preventable and/or delayable, even in an event that a value of the driving speed exceeds the predefined threshold value.

9. The motor vehicle according to claim 2, further comprising:
  one or more vehicle environment sensors providing vehicle environment information, wherein movement of the external rearview mirror from the first mirror position into the second mirror position is preventable and/or delayable as a function of the vehicle environment information, even in an event that a value of the driving speed exceeds the predefined threshold value.

10. The motor vehicle according to claim 2, further comprising:
a driver consent unit configured to obtain a drivers consent before moving the external rearview mirror from the first mirror position into the second mirror position, even in an event that a value of the driving speed exceeds the predefined threshold value.

11. The motor vehicle according to claim 2, wherein the control unit is configured to analyze a time history of vehicle driving speed in order to recognize an imminent exceeding and/or falling below of the predefined threshold value.

12. The motor vehicle according to claim 1, wherein the mirror drive comprises at least one electric motor controlled via the control unit.

13. A method of operating an external rearview mirror of a motor vehicle equipped with an electronic display viewable by a driver, the electronic display receiving images obtained from a camera directed toward rearward surroundings of the vehicle, the method comprising the acts of:
determining a vehicle speed of the motor vehicle;
determining that a value of the vehicle speed exceeds a first predefined threshold value that is greater than a second predefined threshold value;
determining a time period that the value of the driving speed exceed the first predefined threshold value;
moving the external rearview mirror from a first mirror position providing a rearview to the driver via the external rearview mirror into a second mirror position not providing the rearview to the driver via the external rearview mirror when the time period exceeds a predefined length of time;
determining a type of road that the motor vehicle is traveling on, wherein the predefined length of time associated with the time period that the value of the driving speed exceeds the first predefined threshold value is adjusted based at least in part on the determined type of road;
determining that the value of the driving speed falls below the second predefined threshold value;
moving the external rearview mirror from the second mirror position into the first mirror position when the value of the driving speed falls below the second predefined threshold value; and
in the second mirror position, providing the rearview to the driver via the electronic display.

14. The method according to claim 13, wherein the act of moving the external rearview mirror from the first mirror position into the second mirror position further comprises the act of swiveling the external rearview mirror from the first mirror position into the second mirror position when the predefined threshold vehicle speed value is exceeded.

15. The method according to claim 13, further comprising the act of:
determining the predefined threshold value over which the external rearview mirror is moved from the first mirror position into the second mirror position, the predefined threshold value being based on an ecologically significant value range.

16. The method according to claim 14, further comprising the act of:
preventing the moving of the external rearview mirror from the first mirror position into the second mirror position, when the predefined threshold vehicle speed value is exceeded, via an operating action of the driver.

17. The method according to claim 14, further comprising the act of:
preventing the movement of the external rearview mirror from the first mirror position into the second mirror position, when the vehicle speed exceeds the predefined threshold vehicle speed value, as a function of a driver's viewing direction.

18. The method according to claim 14, further comprising the act of:
preventing the movement of the external rearview mirror from the first mirror position into the second mirror position, when the vehicle speed exceeds the predefined threshold vehicle speed value as a function of environmental conditions.

19. The method according to claim 13, further comprising the act of: prompting a driver to provide consent before carrying out the act of moving the external rearview mirror from the first mirror position into the second mirror position.

20. The motor vehicle according to claim 1, wherein the control unit is further operatively configured to control the mirror drive such that the movement of the rearview mirror from the first mirror position into the second mirror position takes place only if the driver of the vehicle has not looked at the rearview mirror within an analyzed time period.

* * * * *